US010080159B2

United States Patent
Valliappan et al.

(10) Patent No.: US 10,080,159 B2
(45) Date of Patent: Sep. 18, 2018

(54) DYNAMIC BANDWIDTH MANAGEMENT FOR LOAD-BASED EQUIPMENT IN UNLICENSED SPECTRUM

(71) Applicant: QUALCOMM Incorporated, San Diego, CA (US)

(72) Inventors: Nachiappan Valliappan, San Diego, CA (US); Kiran Somasundaram, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/471,840

(22) Filed: Aug. 28, 2014

(65) Prior Publication Data

US 2015/0373582 A1 Dec. 24, 2015

Related U.S. Application Data

(60) Provisional application No. 62/016,331, filed on Jun. 24, 2014.

(51) Int. Cl.
*H04W 28/08* (2009.01)
*H04W 16/14* (2009.01)
(Continued)

(52) U.S. Cl.
CPC .......... *H04W 28/08* (2013.01); *H04W 16/14* (2013.01); *H04W 72/082* (2013.01);
(Continued)

(58) Field of Classification Search
CPC ... H04W 28/08; H04W 16/14; H04W 72/082; H04L 43/04; H04L 43/0841; H04L 43/0835
See application file for complete search history.

(56) References Cited

U.S. PATENT DOCUMENTS 8,918,102 B2 * 12/2014 Wang ................. H04W 16/30
455/435.2
9,985,856 B2 * 5/2018 Liu ..................... H04L 43/0829
(Continued)

FOREIGN PATENT DOCUMENTS

EP 2 180 750 A1 4/2010

OTHER PUBLICATIONS

Li et al., "Cognitive Radio Multiple Access Control for Unlicensed and Open Spectrum with Reduced Spectrum Sensing Requirements," Department of Electronics, The University of York, York, United Kingdom, pp. 1046-1050.
(Continued)

*Primary Examiner* — Asad M Nawaz
*Assistant Examiner* — Syed S Ali
(74) *Attorney, Agent, or Firm* — Arent Fox LLP

(57) ABSTRACT

Systems and methods for dynamic bandwidth management for load-based equipment in unlicensed spectrum are disclosed. In an aspect, the disclosure provides a method for dynamic bandwidth management. The method includes obtaining training data by monitoring a plurality of channels in an unlicensed spectrum during a training period. The method further includes determining that at least a first channel of the plurality of channels is available for a transmission. The method also includes determining, based on the training data, whether to wait for an additional channel of the plurality of channels to become available for the transmission. Determining whether to wait may be based on either training data including probabilities that no additional channel is to become available within a transmission opportunity or a machine learning classification of a current state of the backoff counters based on training data including samples of previous states of backoff counters.

24 Claims, 12 Drawing Sheets

(51) Int. Cl.
  *H04W 72/08* (2009.01)
  *H04W 28/20* (2009.01)
  *H04W 72/12* (2009.01)
  *H04W 74/08* (2009.01)
(52) U.S. Cl.
  CPC .......... *H04W 28/20* (2013.01); *H04W 72/085* (2013.01); *H04W 72/1215* (2013.01); *H04W 74/0808* (2013.01)

(56) References Cited

U.S. PATENT DOCUMENTS

| | | | | |
|---|---|---|---|---|
| 2003/0123405 | A1* | 7/2003 | del Prado | H04W 74/0816 370/331 |
| 2006/0133647 | A1* | 6/2006 | Werner | H04N 19/467 382/100 |
| 2008/0187032 | A1* | 8/2008 | Pande | H04L 25/0204 375/227 |
| 2008/0305788 | A1* | 12/2008 | Malladi | H04J 11/0069 455/428 |
| 2009/0083494 | A1* | 3/2009 | Bhanoo | G06F 17/30902 711/141 |
| 2010/0296404 | A1* | 11/2010 | Quadri | H04W 72/02 370/252 |
| 2011/0128895 | A1 | 6/2011 | Sadek et al. | |
| 2012/0087235 | A1* | 4/2012 | Smith | H04L 41/0677 370/221 |
| 2012/0164950 | A1* | 6/2012 | Nentwig | H04W 28/18 455/63.1 |
| 2013/0163575 | A1* | 6/2013 | Pak | H04W 74/00 370/338 |
| 2014/0064101 | A1 | 3/2014 | Hart et al. | |
| 2014/0119277 | A1* | 5/2014 | Athankutty | H04W 88/06 370/328 |
| 2014/0133435 | A1* | 5/2014 | Forenza | H04B 7/0626 370/329 |
| 2014/0185428 | A1* | 7/2014 | Thibeault | H04L 47/12 370/225 |
| 2015/0351018 | A1* | 12/2015 | Kim | H04W 48/16 370/338 |
| 2015/0373582 | A1* | 12/2015 | Valliappan | H04W 28/08 370/329 |
| 2016/0337111 | A1* | 11/2016 | Kam | H04L 5/14 |

OTHER PUBLICATIONS

Xu et al., "Enhanced Clear Channel Assessment based on statistical characteristics," School of Electronic Engineering, Beijing University of Posts and Telecommunications, Beijing, China, 4 pages.

Broustis J., et al., "Multiband Media Access Control in Impulse-Based UWB Ad Hoc Networks", IEEE Transactions on Mobile Computing, IEEE Service Center. Los Alamitos, CA. US. vol. 6, No. 4, Apr. 1, 2007 (Apr. 1, 2007), pp. 351-366, XP011172117, ISSN: 1536-1233. DOI: 10.1109/TMC.2007.58 p. 356. right-hand column, line 3-p. 357, left-hand column, line 4.

International Search Report and Written Opinion—PCT/US2015/036432—ISA/EPO—dated Sep. 14, 2015. (10 total pages).

* cited by examiner

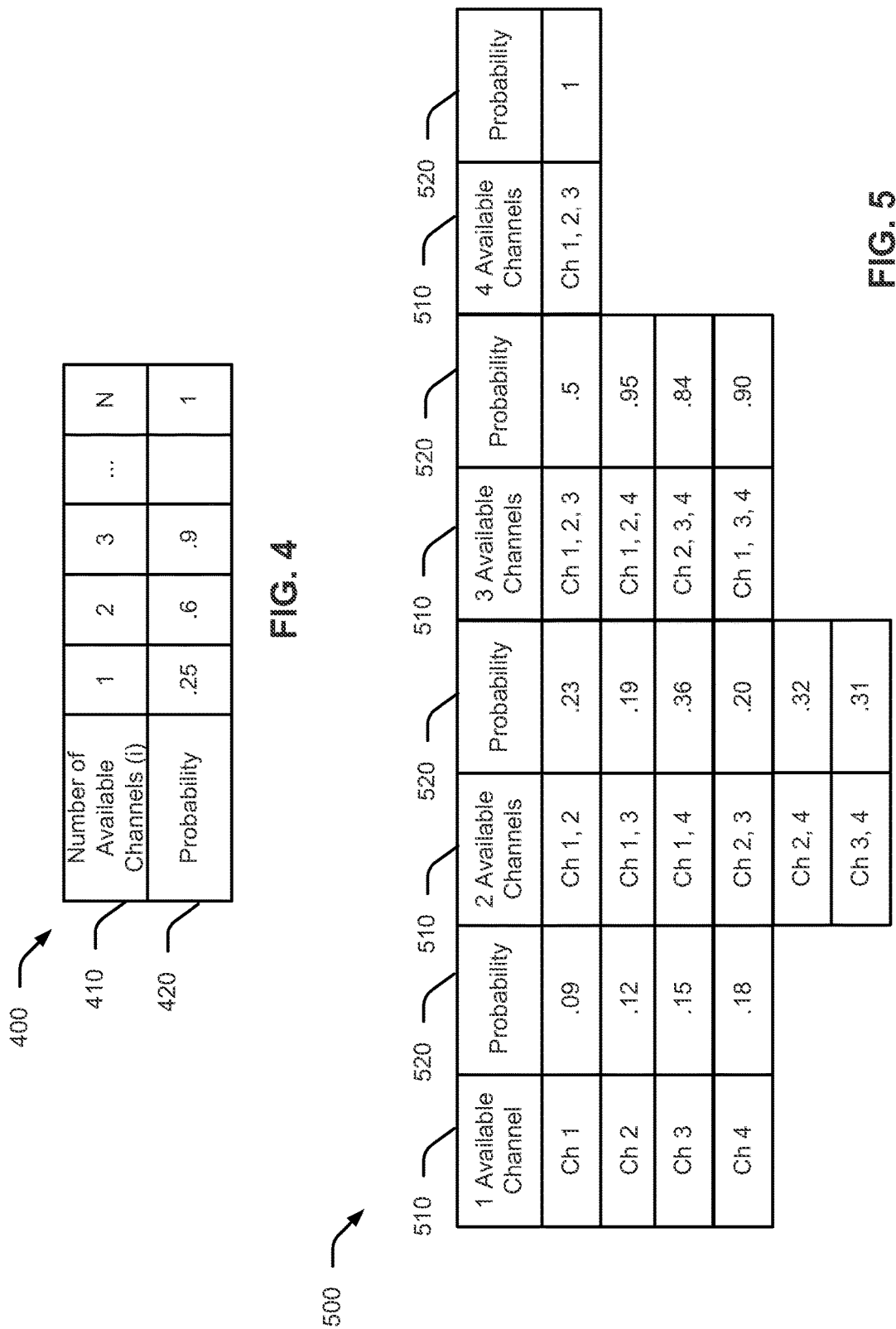

DYNAMIC BANDWIDTH MANAGEMENT FOR LOAD-BASED EQUIPMENT IN UNLICENSED SPECTRUM

CROSS-REFERENCE TO RELATED APPLICATIONS

The present application for patent claims priority to U.S. Provisional Patent Application No. 62/016,331, "Methods and Apparatus for Dynamic Bandwidth Management for Load-Based Equipment in Unlicensed Spectrum" filed Jun. 24, 2014, and assigned to the assignee hereof and hereby expressly incorporated by reference herein in its entirety.

BACKGROUND

Aspects of this disclosure relate generally to telecommunications, and more particularly to interference mitigation and the like.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication between devices in a wireless communication network may be subject to interference. For a communication from a first network device to a second network device, emissions of radio frequency (RF) energy by a nearby device may interfere with reception of signals at the second network device. For example, a Long Term Evolution (LTE) device operating in an unlicensed RF band that is also being used by a Wi-Fi device may experience significant interference from the Wi-Fi device, and/or can cause significant interference to the Wi-Fi device.

Over-the-air interference detection is employed in some wireless communication networks in an attempt to mitigate such interference. For example, a device may periodically monitor (e.g., sniff) for energy in the RF band used by the device. Upon detection of any kind of energy, the device may back-off the RF band for a period of time.

In practice, however, there may be problems with such a back-off or "listen-before-talk" (LBT) approach, at least in its conventional implementation. For example, for an LTE system operating in an unlicensed band with a Wi-Fi co-channel scenario where it is desired to avoid interference from Wi-Fi, the detected energy in the band might not be from a Wi-Fi device, or might not be substantial. In addition, the detected energy in the band may simply be adjacent channel leakage. Consequently, an LTE device may back off transmissions in the band even when there is no Wi-Fi interference.

SUMMARY

Systems and methods for dynamic bandwidth management for load based equipment operating in unlicensed spectrum are disclosed.

In an aspect, the disclosure provides a method for dynamic bandwidth management. The method may include obtaining training data by monitoring a plurality of channels in an unlicensed spectrum during a training period. The method may further include determining that at least a first channel of the plurality of channels is available for a transmission. The method may also include determining, based on the training data, whether to wait for an additional channel of the plurality of channels to become available for the transmission.

In an aspect, the disclosure provides an apparatus for dynamic bandwidth management. The apparatus may include a channel assessing component configured to obtain training data by monitoring a plurality of channels in an unlicensed spectrum during a training period. The apparatus may further include a training component configured to determine that at least a first channel of the plurality of channels is available for a transmission. The apparatus may also include a channel selecting component configured to determine, based on the training data, whether to wait for an additional channel of the plurality of channels to become available for the transmission.

In another aspect, the disclosure provides an apparatus for dynamic bandwidth management. The apparatus may include means for obtaining training data by monitoring a plurality of channels in an unlicensed spectrum during a training period. The apparatus may further include means for determining that at least a first channel of the plurality of channels is available for a transmission. The apparatus may also include means for determining, based on the training data, whether to wait for an additional channel of the plurality of channels to become available for the transmission.

The disclosure provides, in an aspect, a computer readable medium storing computer executable code. The computer readable medium may include code for obtaining training data by monitoring a plurality of channels in an unlicensed spectrum during a training period. The computer readable medium may further include code for determining that at least a first channel of the plurality of channels is available for a transmission. The computer readable medium may also include code for determining, based on the training data, whether to wait for an additional channel of the plurality of channels to become available for the transmission. The computer readable medium may be a non-transitory computer readable medium.

These and other aspects of the invention will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof.

FIGS. 4 and 5 illustrate examples of data structures that may be used for storing a set of probabilities for a set of channel states.

DETAILED DESCRIPTION

Figure 1:
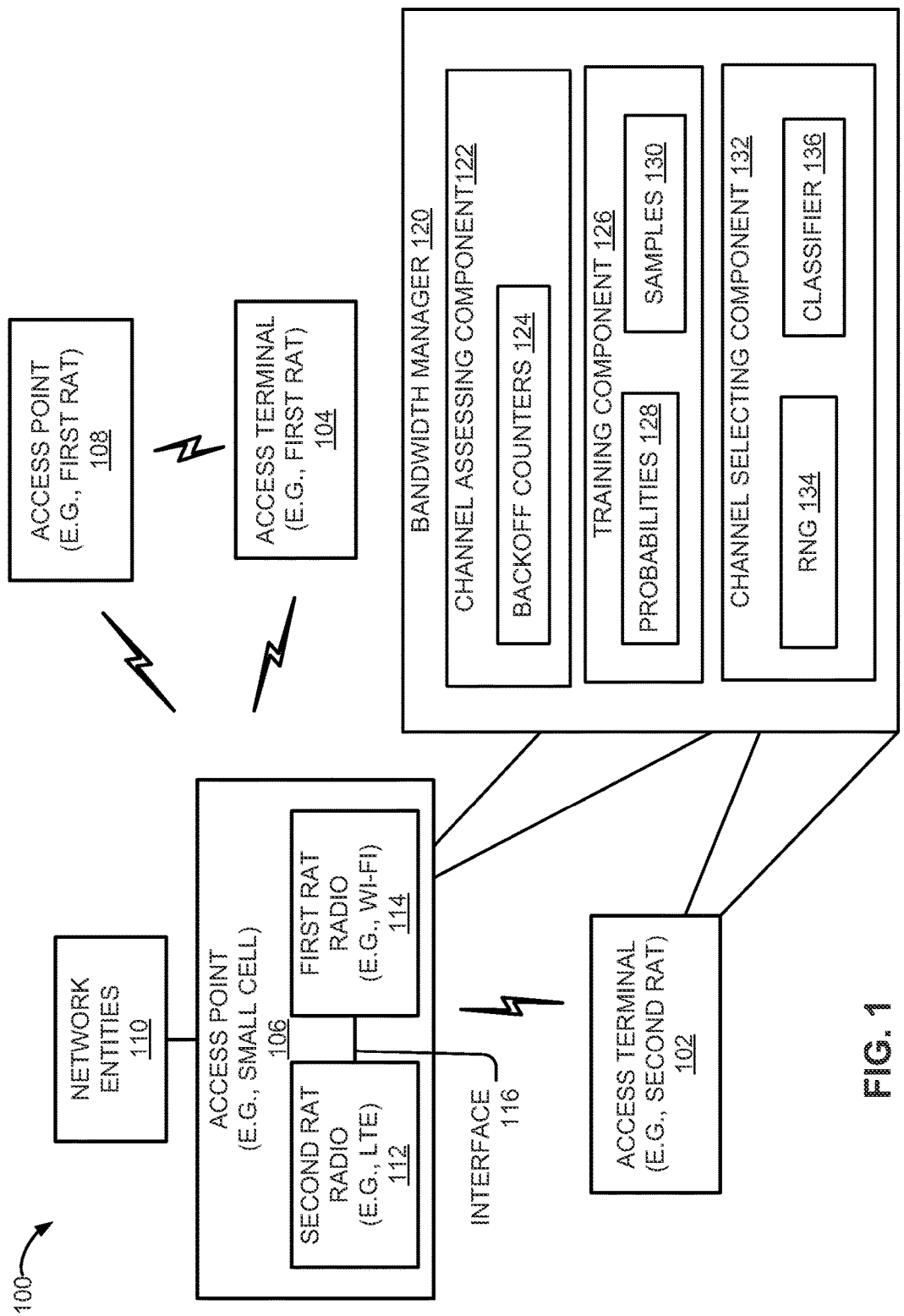
FIG. 1 is a simplified block diagram of several sample aspects of a communication system.

The disclosure relates in some aspects to dynamic bandwidth management for determining whether to transmit in a "listen-before-talk" (LBT) scenario. A load-based equipment (LBE) may perform clear channel assessment (CCA) or enhanced clear channel assessment (eCCA) to determine whether a particular channel is clear or available for transmission. The LBE may also transmit using multiple channels if they are clear or available for transmission. When the LBE determines that a first channel is clear, the LBE may determine whether to transmit using the available channel(s) or to wait for additional channels to become available in order to increase the bandwidth of the transmission. If the LBE waits too long, however, total bandwidth may be reduced because of unused transmission opportunities (e.g. the time spent waiting rather than transmitting) and lost transmission opportunities (e.g., previously clear channels are no longer available) while waiting for the additional channels to become available. By predicting the likelihood of an additional channel becoming available, the LBE may increase available bandwidth by waiting for additional channels when it is likely that those additional channels will become available.

The LBE may estimate the probability that an additional channel will become available based on historical trends in the radio environment. The LBE may monitor the availability of channels during a training phase and use acquired information during a testing phase. In one aspect, the LBE may determine probabilities based on a number of available channels or based on the combination of individual available channel(s). In another aspect, the LBE may classify a current transmission opportunity based on the states of random backoff counters using a machine learning model.

Therefore, in aspects of the disclosure, methods and apparatus are described in which training data may be obtained by monitoring multiple channels in an unlicensed spectrum during a training period, determining that at least a first channel of the multiple channels is available for a transmission, and determining, based on the training data, whether to wait for an additional channel of the multiple channels to become available for the transmission. In some instances, it may be beneficial to wait for the additional channel to become available and provide additional bandwidth. In other instances, when the current available channels may not be clear for transmission for much longer, it may be better not to wait for the additional channel and transmit using the currently available bandwidth.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

When the access point 106 (or any other devices in the system 100) uses a first RAT to communicate on a given resource, this communication may be subjected to interference from nearby devices (e.g., the access point 108 and/or the access terminal 104) that use a second RAT to communicate on that resource. For example, communication by the access point 106 via LTE on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In an aspect of the present disclosure, a device operating in unlicensed spectrum may operate in a load-based system. In a load-based system, unlike a frame-based system, devices may not have set transmission times. In a load-based system, an LBT procedure may be used to determine whether one or more channels are available for transmission. For example, a device may perform CCA/eCCA to determine whether a channel is clear for transmission. When a channel is not clear, the device may initialize a random backoff counter for the channel. The random backoff counter may countdown for each measured time slot where the channel is available. When the random backoff counter reaches 0, the device may transmit for a limited transmission opportunity. The duration of the transmission opportunity may be a multiple of the CCA time slot duration. During the transmission opportunity, other devices would be blocked by the transmission from also transmitting using the channel. Additionally, other channels on the same device, which are not being used for a transmission, may also be blocked because of RF leakage.

Various standards may define the LBT procedures that must be used. Current standards, however, do not define procedures for a multi-channel scenario. Both LTE and Wi-Fi may use multiple channels. In Wi-Fi, the transmission bandwidth can vary across 20, 40, 80, or even 160 MHz from one packet to the next. This may be viewed as a transmission using multiple channels.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 100, different RATs may make use of different channels at different times. Because different RATs are sharing the spectrum and operating partly independently of others, access to one channel may not imply access to another channel. Accordingly, a device capable of transmitting using multiple channels may need to determine whether each channel is available before transmitting. In order to increase bandwidth and throughput, it may be beneficial in some situations to wait for an additional channel to become available rather than transmitting using currently available channel(s).

In an aspect, an LBE such as access terminal 102 or access point 106 may include a bandwidth manager 120 for determining which channels to use for a transmission. It should be appreciated that any wireless device acting as an LBE may include a bandwidth manager 120. In an aspect, a device may act as a LBE part of the time, or while operating in particular modes. For example, access point 106 may act as a LBE when operating using a first RAT, but may operate in a frame based manner when operating using a second RAT.

Bandwidth manager 120 may include hardware or means for determining the channels or bandwidth to use for transmissions. In particular, bandwidth manager 120 may determine whether to transmit using currently available channels, or to wait for additional channels to become available. Bandwidth manager 120 may include a channel assessing component 122, a training component 126, and a channel selecting component 132. In an aspect, the term "component" as used herein may be one of the parts that make up a system, may be hardware or software, and may be divided into other components.

The channel assessing component 122 may include hardware configured to determine whether a channel is available for a transmission. For example, channel assessing component 122 may include a receiver (not shown) configured to measure received signal energy in a channel. Channel assessing component 122 may determine that a channel is clear when the signal energy falls below a threshold value. In an aspect, channel assessing component 122 may determine whether a channel is available according to regulations or a standard. For example, EN 301.893 may define LBT procedures. IEEE 802.11 and 802.15 standards may define clear channel assessment (CCA) procedures. Generally, the CCA procedures may involve monitoring a channel for a CCA duration or time slot, for example 20 microsecond (μs). If the time slot is clear (e.g., the communications medium is available or accessible), the device may begin using the channel. If the channel is not clear, the device may determine a random backoff counter for the channel. Each time the device detects a clear time slot, the random backoff counter is decremented.

Channel assessing component 122 may maintain backoff counters 124, where each of the backoff counters 124 corresponds to a different channel. For example, the backoff counters 124 may be a memory configured to store values for each channel. The channel assessing component 122 my assign a random value to a backoff counter 124 whenever there is data to transmit, but the channel is busy. The channel assessing component 122 may decrement each backoff counter 124 when the corresponding channel is clear for a time slot. The corresponding channel may be considered available when the backoff counter reaches 0. Accordingly, when an LBE would like to use multiple channels for a transmission, the channels may become available at different times. In an aspect, the backoff counters 124 may also be used to measure how long a channel has been available. For example, the channel assessing component 122 may continue to decrement the backoff counters 124 into negative numbers, where a negative number indicates how long the corresponding channel has been available. In another aspect, the channel assessing component 122 may include a flag or similar functionality to indicate whether the channel is available and to increment the backoff counters 124 to indicate how long the corresponding channel has been available.

Training component 126 may include hardware configured to monitor a plurality of channels during a training period. For example, training component 126 may include a processor (not shown) configured to process information obtained by channel assessing component 122. The training period may be a time period prior to a transmission. The training period may include times when the LBE is idle. The training period may also include times when the LBE is actively transmitting. In an aspect, the training period may be a sliding window preceding a transmission. The training component 126 may capture information regarding the status of the channels during the training period that may be used to predict whether the LBE will be able to increase bandwidth or throughput by waiting for an additional channel to become available before the end of a transmission opportunity when a subset of channels are already available for transmission.

In an aspect, the training component 126 may include probabilities 128. The probabilities 128 may be stored in a memory accessible to other components of the bandwidth manager 120. The probabilities 128 may indicate a probability of an additional channel becoming available during a transmission opportunity and/or the probability of no additional channels becoming available during a transmission opportunity. In other words, the probabilities 128 may indicate the probability that acquiring the available channels at the current time slot would be a good transmission opportunity. In an aspect, a good transmission opportunity may be defined as a transmission opportunity starting at a time slot where the total number of available channels does not increase during the transmission opportunity. The probabilities 128 may be determined by training component 126 based on real and/or hypothetical transmission opportunities during the training period. For example, the training component 126 may evaluate a real transmission to determine whether an additional channel became available during the transmission opportunity. The training component 126 may likewise evaluate periodic hypothetical transmission opportunities during the training period. The probabilities 128 may be based on the percentage of transmissions where additional channels did and did not become available during the transmission opportunity.

In another aspect, the training component 126 may include samples 130. The samples 130 may record the state of the backoff counters 124 during the training period. The samples 130 may be stored in a memory. The training component 126 may store the value of each backoff counter 124 during a time slot along with an evaluation of whether starting a transmission at the time slot would have been good. In other words, the training component 126 may determine whether the transmission time of the sample was a good transmission time. The training component 126 may retroactively evaluate the samples 130 after the transmission opportunity following the time slot to determine whether starting a transmission at the time slot of the sample was a good time to start a transmission. A determination that starting a transmission at a time slot would have been good may indicate that no additional channels became available during the transmission opportunity following the time slot. In another aspect, determining that a time slot is good may include determining that the number of available channels was not greater at any time slot during the transmission opportunity following the time slot. In another aspect, determining that a time slot is good may include determining that a bandwidth of the available channels was not greater at any time slot during the transmission opportunity following the time slot.

Channel selecting component 132 may include hardware configured to determine whether to transmit using currently available channels. For example, channel selecting component 132 may include a processor (not shown) configured to perform the various functions of the channel selecting component 132. In an aspect, channel selecting component 132 may use information determined by channel assessing component 122 for a current time slot and information from training component 126 to determine whether to transmit using the currently available channels.

In an aspect, channel selecting component 132 may determine whether to transmit based on the probabilities 128. The channel selecting component 132 may obtain a probability 128 corresponding to the current channel conditions and determine whether to transmit based on the probability. For example, the channel selecting component 132 may compare the probability to a threshold value to determine whether to transmit. In an aspect, the channel selecting component 132 may include a random number generator (RNG) 134 configured to randomly or pseudo-randomly generate a number. The channel selecting component 132 may compare the random or pseudo-random number to the probability. For example, if the number is less than a probability that no additional channels will become available, then the channel selecting component 132 may determine to transmit with the currently available channels.

In an aspect, channel selecting component 132 may determine whether to transmit with a currently available channel(s) based on the samples 130. The channel selecting component 132 may include a machine learning classifier 136 to determine whether starting a transmission with the current state of the backoff counters 124 is likely to be good. The definition of a good state of the backoff counters 124 may be the same as the definition used to evaluate the samples 130; however, because the evaluation of the time slot may not be known for certain until after the transmission opportunity, the classifier 136 may be used to predict the evaluation. Generally, the classifier 136 may compare the current counter state vector with the history of training samples 130. The classifier 136 may determine a class boundary based on the samples 130 and determine how to classify the current state vector based on the class boundary. Various machine learning classifiers or models known in the art may be used. Example classifiers include logistic regression, support vector machine (SVM), Kernel-SVM, Linear Discriminant Analysis, Naïve Bayes classifier, neural networks, k-nearest neighbor, Gaussian mixture models, and Radial basis function classifier.

Figure 2:
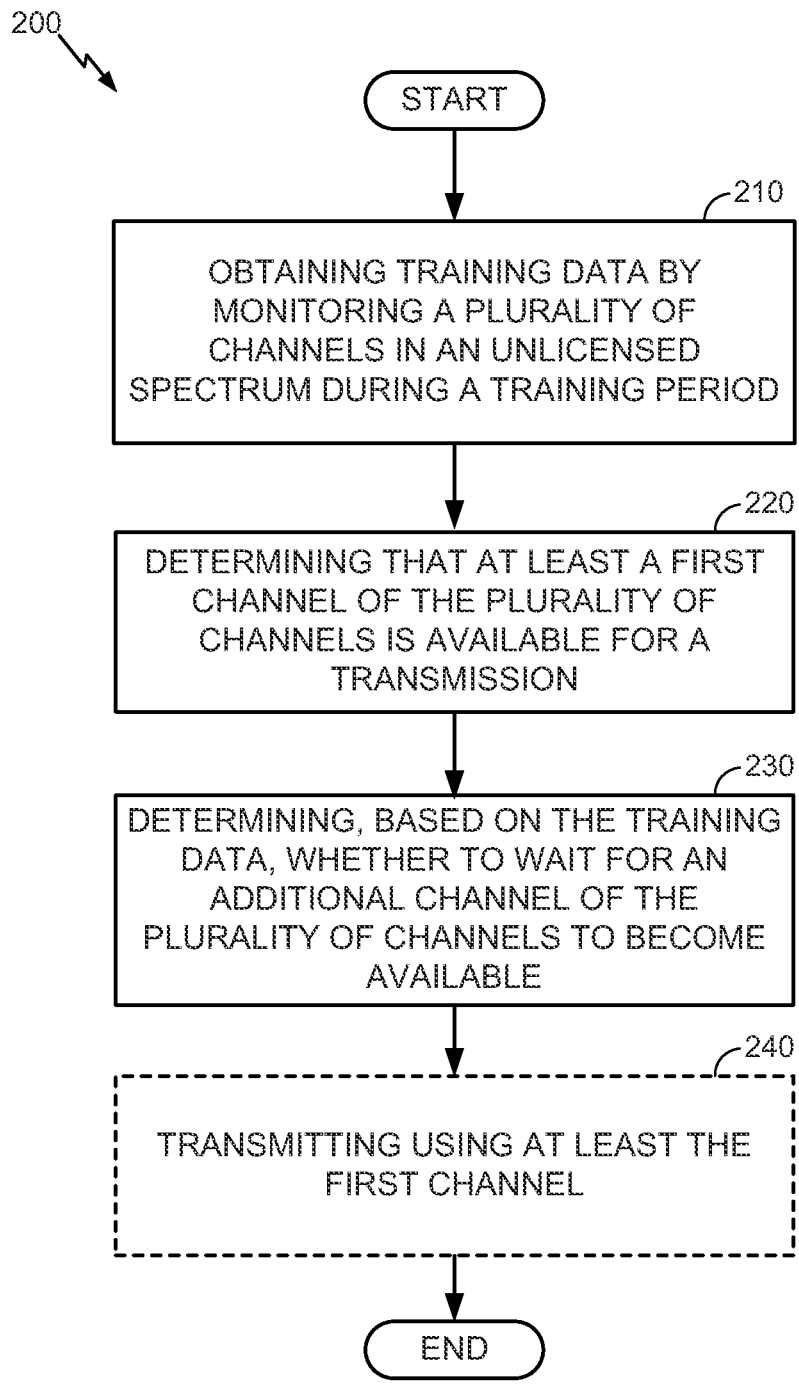
FIG. 2 is a flow diagram illustrating an example method of dynamic bandwidth management.

FIG. 2 is a flow diagram illustrating an example method 200 of dynamic bandwidth management. The method may be performed by an LBE (e.g., the access terminal 102 or the small cell access point 106 illustrated in FIG. 1).

At block 210, the method 200 may include obtaining training data by monitoring a plurality of channels in an unlicensed spectrum during a training period. The training component 126 may obtain training data by monitoring the plurality of channels during the training period. The training component 126 may use information determined by the channel assessing component 122 to monitor the plurality of channels. In an aspect, obtaining the training data may include estimating for a set of channels states, a corresponding set of probabilities indicating likelihoods that an additional channel will become available within a transmission opportunity. In another aspect, obtaining the training data may include collecting samples for potential transmission times having at least one available channel. The samples may include states of a plurality of backoff counters 124 corresponding to the plurality of channels.

At block 220, the method 200 may include determining that at least a first channel of the plurality of channels is available for a transmission. The channel assessing component 122 may determine that a first channel of the plurality of channels is available for the transmission. The channel assessing component 122 may assess the channel based on presence of data for the transmission. The determination that the channel is available may include determining that a backoff counter 124 has reached 0.

At block 230, the method 200 may include determining, based on the training data, whether to wait for an additional channel of the plurality of channels to become available. The channel selecting component 132 may determine whether to wait for an additional channel of the plurality of channels to become available. In an aspect, the channel selecting component 132 may use the probabilities 128 to estimate a probability that an additional channel will become available during a transmission opportunity. The channel selecting component 132 may then determine whether to transmit during the transmission opportunity based on the probability of an additional channel becoming available. In another aspect, the channel selecting component 132 may use the classifier 136 to determine whether to transmit based on the samples 130. The classifier 136 may classify a current state of the backoff counters 124 as either a good transmission opportunity or a bad transmission opportunity based on the samples 130. As discussed above, the classification of a transmission opportunity as "good" may indicate that the classifier 136 predicts that the number of channels or the bandwidth of the channels will not increase during a transmission opportunity. Conversely, a classification of a transmission opportunity as "bad" may indicate that the classifier 136 predicts that an additional channel will become available during the transmission opportunity.

At block 240, the method 200 may optionally include transmitting using at least the first channel. A transmitter in an LBE (e.g., access terminal 102) may transmit using at least the first channel. The transmitter may also transmit using any additional channels selected by the channel selecting component 132. The transmitter may begin the transmission immediately after determining not to wait. If the channel selecting component 132 determines to wait, the transmission may take place after another channel becomes available, or after waiting for the duration of a transmission opportunity.

Figure 3:
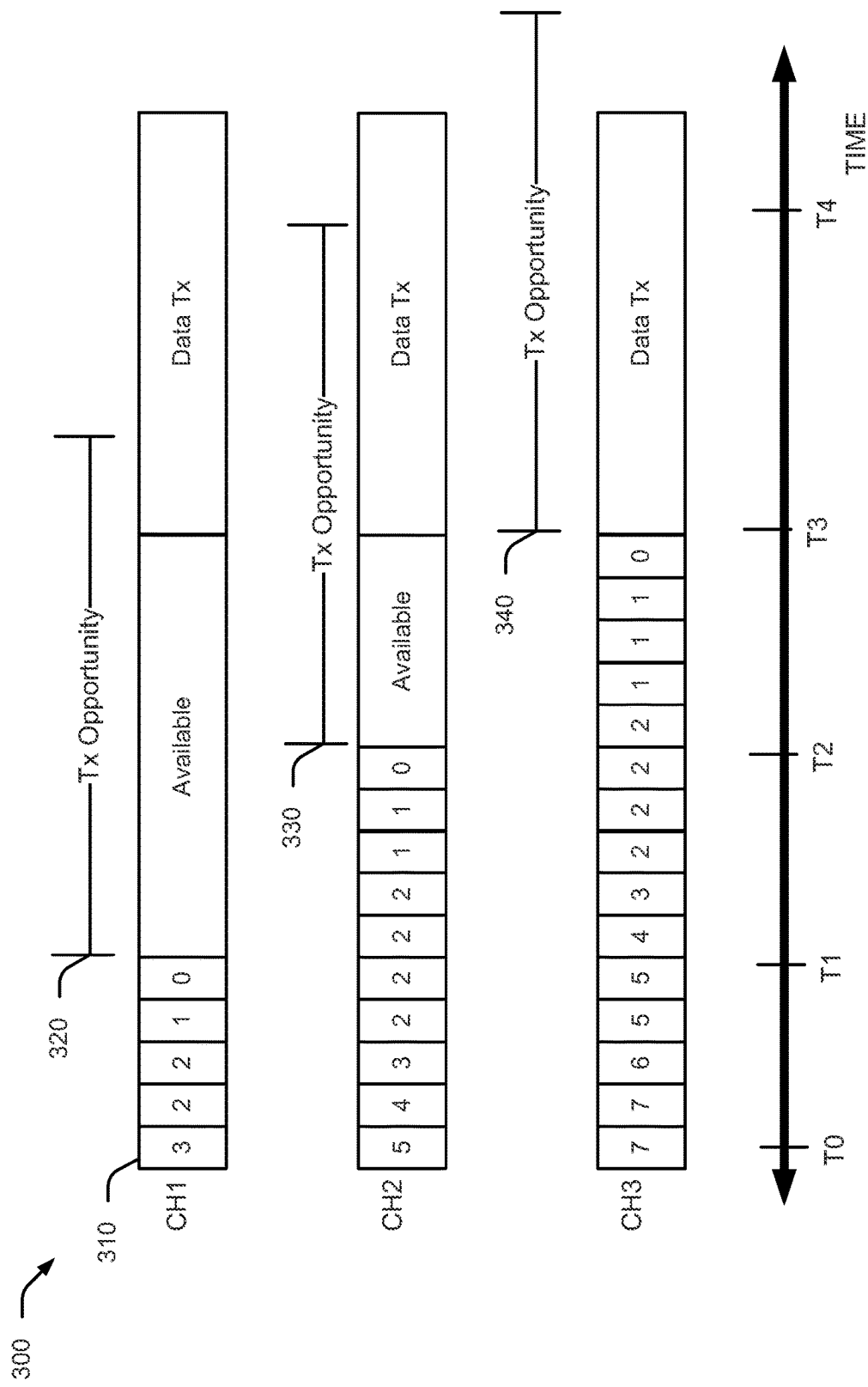
FIG. 3 illustrates an example of a scenario for dynamic bandwidth management using multiple channels.

FIG. 3 illustrates an example of a scenario 300 for dynamic bandwidth management using multiple channels as described with respect to FIGS. 1 and 2. Three channels are illustrated in FIG. 3 with respective counters 310, but it should be apparent that a system may use additional channels. When a channel is busy and an LBE has data to transmit, the backoff counter 124 corresponding to the channel may be assigned a random value. For example, at time 0, channel 1 (CH1) may have a counter value of 3, channel 2 (CH2) may have a counter value of 5, and channel 3 (CH3) may have a counter value of 7. The channel may be checked for usage every CCA time slot. The counters 310 are illustrated for each time slot when the channel is not available. When no usage of a channel is detected, the counters may be decremented. It should be noted that a channel may not be used, but may not be available because the associated counter 310 has not reached 0.

At time T1, channel 1 may become available. The dynamic bandwidth manager 120 may determine whether to transmit during the transmission opportunity 320 starting at T1 using the available channel 1, or to wait for an additional channel (e.g., channel 2 or channel 3) to become available. A transmission opportunity may be a maximum amount of time an LBE may use a channel for transmission before it must perform a CCA or allow another device to use the channel. Waiting for an additional channel to become available may increase available bandwidth for the transmission during a transmission opportunity, and therefore increase throughput. For example, at time T2, channel 2 may become available. Assuming channel 1 and channel 2 have the same bandwidth, the additional channel may double the available bandwidth. Accordingly, the LBE may increase throughput by waiting for the transmission opportunity 330 beginning at time T2.

At time T2, the dynamic bandwidth manager 120 may also determine whether to wait for channel 3 to also become available. If channel 3 becomes available at time T3, the dynamic bandwidth manager 120 may further increase the bandwidth by using three channels during transmission opportunity 340. If, however, channel 3 did not become available until time T4, the bandwidth manager component 120 may maximize throughput by starting a first transmission at T2, and a second transmission at T4.

FIG. 4 illustrates an example of a data structure 400 that may be used for storing a set of probabilities for a set of channel states in accordance with the dynamic bandwidth management using multiple channels as described with respect to FIGS. 1 and 2. As illustrated in FIG. 4, the set of channel states 410 may be the number of available channels in a system (e.g., system 100) having a maximum of N channels. The probability 420 may indicate a probability that no additional channels will become available during a transmission opportunity when the channel state 410 is the current channel state. In other words, the probability 420 indicates the probability that starting a transmission in the channel state 410 is a good choice. The probability 420 for N channels may be 1 because no additional channels can become available. The other values for probability 420 may be based on observations during the training period. Generally, it is expected that the fewer channels that are currently available, the less likely starting a transmission is a good choice.

FIG. 5 illustrates another example of a data structure 500 that may be used for storing a set of probabilities for a set of channel states in accordance with the dynamic bandwidth management using multiple channels as described with respect to FIGS. 1 and 2. As illustrated in FIG. 5, the set of channel states 510 may be based on the number of available channels and combinations of available channels. FIG. 5 illustrates combinations for 4 possible channels; however, the data structure 500 may be expanded for N channels to include $2^N-1$ entries. Data structure 500 may provide a probability 520 for each combination of available channels. Data structure 500 may provide greater precision than data structure 400 in estimating the probability that an additional channel will become available. For example, when one channel is used only infrequently, the probability that the channel will become available may be greater. For example, in FIG. 5, channel 4 may be used infrequently and be generally associated with higher probabilities. The data structure 500 may require additional samples or a longer training period to become reliable. In an aspect, the data structure 400 may be used until sufficient training data is available.

Figure 6:
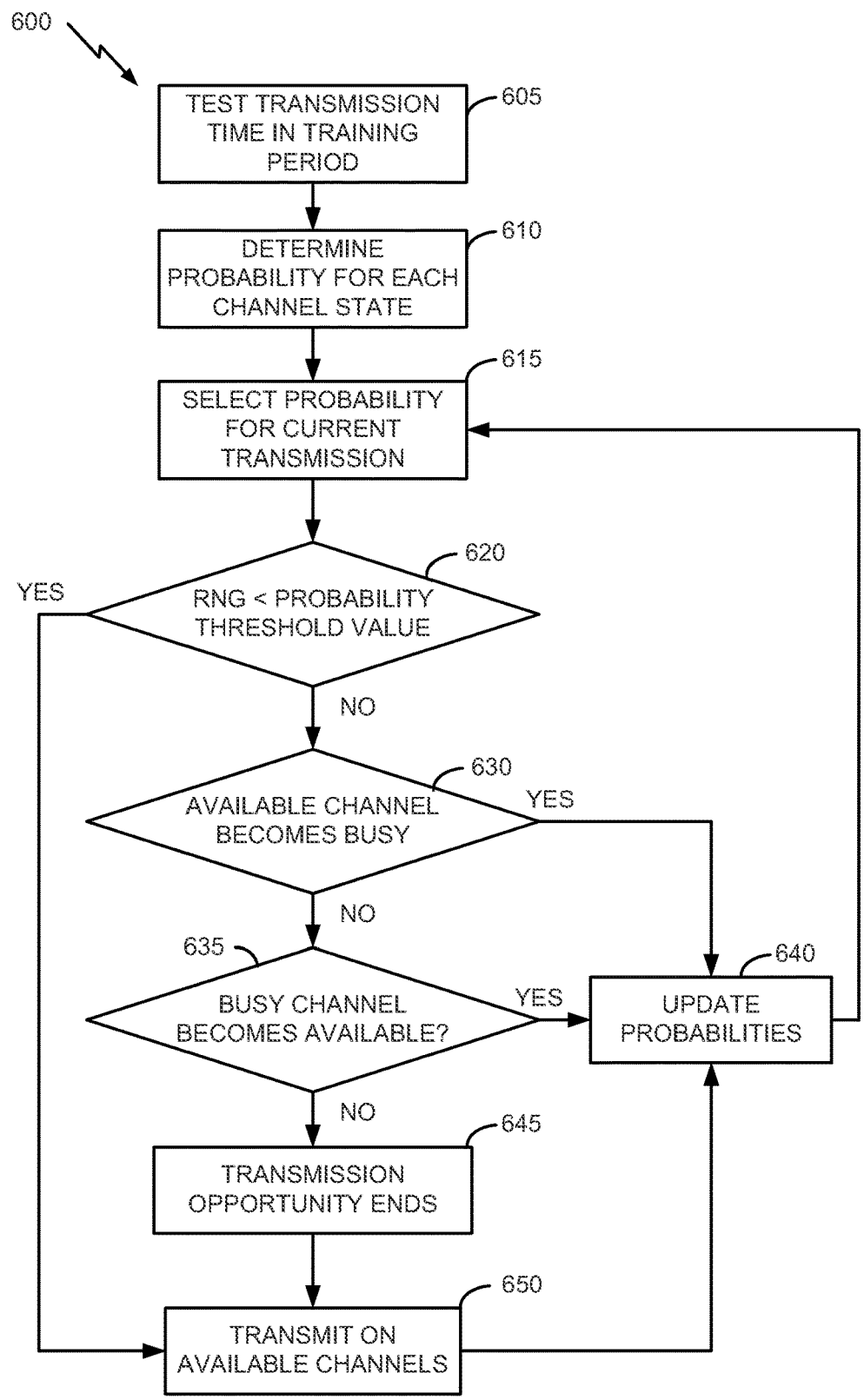
FIG. 6 is a flow diagram illustrating an example method of dynamic bandwidth management using probabilistic channel access.

FIG. 6 is a flow diagram illustrating an example method 600 of dynamic bandwidth management. The method 600 may be performed by the dynamic bandwidth manager 120 of an LBE.

In block 605, the method 600 may include testing a potential transmission time during a training period. The potential transmission time may be a hypothetical transmission time or the transmission time of an actual transmission. The training component 126 may determine, for each potential transmission time, whether an additional channel became available during a transmission opportunity following the transmission time. Block 605 may be performed for a plurality of transmission times. The training component 126 may evaluate each transmission time as either good or bad, based on whether an additional channel became available during the transmission opportunity.

In block 610, the method 600 may include determining a probability for each channel state. The training component 126 may associate each transmission time tested in block 605 with a channel state 410 or 510 based on the available channels at the transmission time. The training component 126 may then determine a portion of the plurality of transmission times when an additional channel became available during the transmission opportunity. For example, the training component 126 may determine a probability 420 or 520 by dividing the number of transmission times when no additional channels became available by the total number of transmission times matching the channel state.

In block 615, the method 600 may include selecting a probability 420 or 520 for a current transmission based on the channel state 410 or 510. For example, the channel selecting component 128 may obtain the probability from data structure 400 or 500 corresponding to the current channel state.

In block 620, the method 600 may include determining whether a random number is less than a probability threshold. For example, the RNG 134 may generate a random or pseudo-random number between 0 and 1. The random or pseudo-random number may then be compared to a probability threshold value. In an aspect, the probability threshold value may be the probability. The probability threshold value, however, may also be weighted by other factors affecting throughput such as the relative bandwidth of the channels, length of a transmission opportunity, and amount of data to transmit. If the random or pseudo-random number is less than the probability threshold value, the method 600 may proceed to block 625 using the available channels as the selected channels. If the random or pseudo-random number is greater than the probability threshold value, the method 600 may wait for an additional channel to become available and proceed to block 630. It should be apparent that inverse probabilities and inequalities, other channel states, and/or other representations of probabilities may be used.

In block 630, the method 600 may include determining whether an available channel has become busy. For example, another device may begin a transmission and an available channel may no longer be available. The channel assessing component 122 may determine that a channel has become busy based on signal energy received on the channel. If a channel has become busy, the number of available channels and the probability that an additional channel will become available may change. Accordingly, the method 600 may proceed to block 640 when an available channel has become busy. The method 600 may proceed to block 635 when no available channel has become busy.

In block 635, the method 600 may include determining whether a busy channel has become available. The channel assessing component 122 may determine whether a busy channel has become available. As discussed above, the channel assessing component 122 may determine that a channel has become available when a backoff counter for the channel has reached 0. When a busy channel becomes available, the probability that an additional channel will also become available may change. Also, the additional available channel may present a good opportunity to transmit. If a busy channel has become available, the method 600 may proceed to block 640 then through blocks 615 and 620 to determine whether to transmit. If no busy channel has become available, the method 600 may proceed to block 645.

In block 640, the method 600 may include updating the probabilities based on changed channel conditions. The probabilities may be updated during the action phase in order to keep the probabilities 128 accurate for a changing radio environment. If an initially available channel became busy and remained busy during the transmission opportunity and no additional channel became available, the initial channel state may be associated with a good opportunity to transmit. If an initially available channel became busy and remained busy during the transmission opportunity, but a new channel also became available, the initial channel state may also be associated with a good opportunity to transmit. If an initially available channel became temporarily busy, but became available again before the end of the transmission opportunity, and another channel also became available, the initial channel state may be associated with a bad opportunity to transmit. The probability 128 corresponding to the initial channel state may be updated. The method 600 may return to block 615 and select a new probability 420 or 520 based on an updated channel state. The method 600 may then proceed to step 620 to determine whether to transmit using the currently available channels based on the probability.

At block 645, the method 600 may include determining that a transmission opportunity has ended. The channel selecting component 132 may determine that a transmission opportunity has ended. The transmission opportunity may be measured from the time when the first channel became available. The channel selecting component 132 may determine to stop waiting for additional channels to become available. The channel selecting component 132 may select the available channels for the transmission. The method may then proceed to block 650.

In block 650, the method 600 may include transmitting using selected channels. The transmission may use the selected channels for the duration of a transmission opportunity. By transmitting using the selected channels, an LBE may effectively prevent other devices from using the selected channels. The transmission may also prevent the LBE from transmitting using additional channels, that is, the LBE may be self-blocked on any channel that becomes available after the LBE starts transmitting. The method 600 may end after the transmission. Alternatively, the method 600 may return to block 640 to update the probabilities 128.

Figure 7:
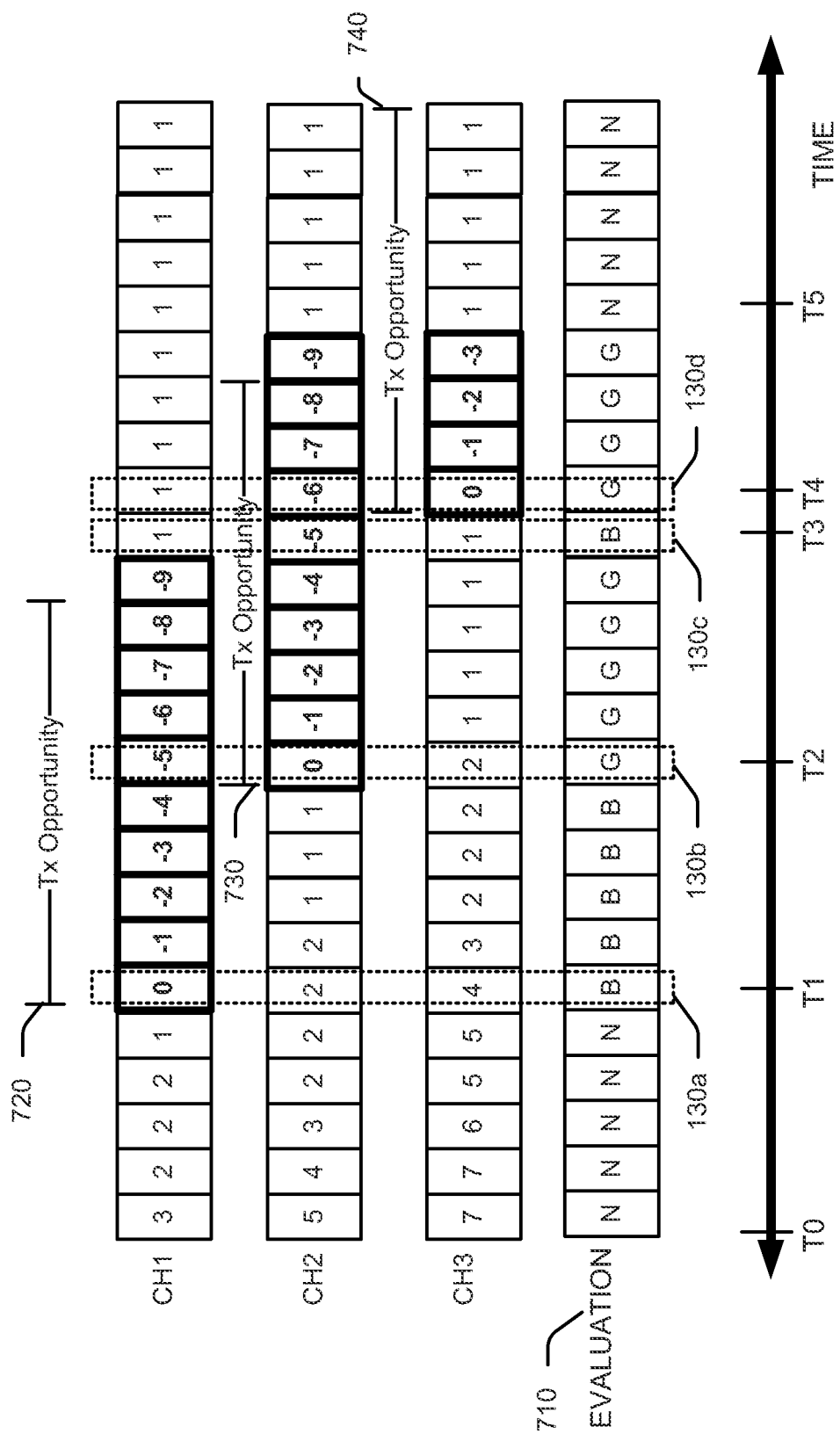
FIG. 7 illustrates an example of a scenario for dynamic bandwidth management using machine learning classification.

FIG. 7 illustrates an example of a scenario for dynamic bandwidth management using a machine learning classifier. Similarly to FIG. 3, discussed above, FIG. 7 illustrates three channels (CH1, CH2, and CH3); however, it should be appreciated that other numbers of channels may be used. FIG. 7 illustrates the state of the backoff counters 124 for each CCA time slot. In an illustrated aspect, an available channel may be represented by a number less than or equal to zero. Negative numbers may represent an amount of time (e.g. a number of CCA periods) that the channel has been available. If a previously available channel becomes busy, the negative number for that channel may freeze at the current value and not further decrement until the channel is available again. In another aspect, if a previously available channel becomes busy, the counter may be reset to 1 to indicate that the channel may be used as soon as it is detected as available. The counter may not reset to a new random positive number because the LBE is not required to wait when the channel becomes available. It should be apparent that the amount of time that a channel has been available may be represented in alternative manners. For example, the amount of time that a channel has been available may be represented by a flag associated with a positive counter or by a separate counter.

During a training period, the training component 126 (FIG. 1) may collect samples 130 of the states of the counters 124. A sample 130 may be illustrated in FIG. 7 by a vertical row of time slots. A sample 130 may also include an evaluation associated with the states of the backoff counters 124 (FIG. 1). The evaluation may be determined retroactively, after a transmission opportunity 720 following a time slot. The training component 126 may not collect samples when no channel is available. For example, the training component 126 may not collect any samples between time T0 and time T1 because all of the channels are busy. At time T1, channel 1 may become available and training component 126 may collect a sample. The sample may include a vector indicating the states of the backoff counters. For example, a sample 130a at time T1 may indicate (0, 2, 4, Bad). In an aspect, the vector may be ordered based on the backoff counters rather than the channels. For example, the states of the backoff counters may be placed in ascending order. The sample 130a at T1 may be labeled "bad" because an additional channel, channel 2, becomes available at time T2, which is within a transmission opportunity 720 following T1. As illustrated in FIG. 7, the samples between T1 and T2 may also be labeled "bad". At time T2, the sample 130b may indicate (−5, 0, 2, Good) because the number of available channels remains at 2, for the remainder of the transmission opportunity 720. If the status of channels 1 and 3 do not change after T2, the samples following T2 during the transmission opportunity 720 may also be labeled "good." In an aspect, the training component 126 may only collect samples during a first transmission opportunity of a first channel to become available. For example, the training component 126 may collect samples only during transmission opportunity 720. The channel selecting component 132 may determine to transmit using available channels at the end of the transmission opportunity 720 regardless of whether an additional channel may become available.

In another aspect, the training component 126 may collect samples after a first transmission opportunity has expired or the transmission opportunity 720 may be longer. Additional examples of possible classifications of samples are provided. As an example, at a time T3, channel 1 may become busy leaving only channel 2 available. The sample 130c at time T3 may indicate (1, −5, 1, Bad) or (−5, 1, 1, Bad) because either channel 1 or channel 3 may become available within the transmission opportunity 730 beginning at time T2. For example, at a time T4 channel 3 may become available, resulting in 2 available channels again. Accordingly, at time T3, when only one channel is available, the channel selecting component 132 is better waiting for an additional channel. Moreover, at time T4, the sample 130d may indicate (1, −6, 0, Good) or (−6, −0, 1, Good) because 2 channels is the maximum number of channels available in the transmission opportunity 740. For example at a time T5, another device may begin transmitting using channels 2 and 3, resulting in no available channels. Times T3, T4, and T5 may all occur within the transmission opportunity 720, or a new transmission opportunity may be measured whenever a channel becomes available. For example, a transmission opportunity 730 may be measured from time T2 when channel 2 becomes available and transmission opportunity 740 may be measured from time T4 when channel 3 becomes available.

In an aspect, the collected samples may be further sorted and/or processed. For example, the samples may be sorted into sets based on the number of available channels. A machine learning classifier may be applied to only a set of the samples to reduce the complexity of the classification model. As another example, the values of the counters may be reordered within a sample such that the counters for the available channels are listed first and the unavailable channels listed afterwards. The counters may be ordered in ascending order. Reordering the counters may reduce complexity of the classification model.

Figure 8:
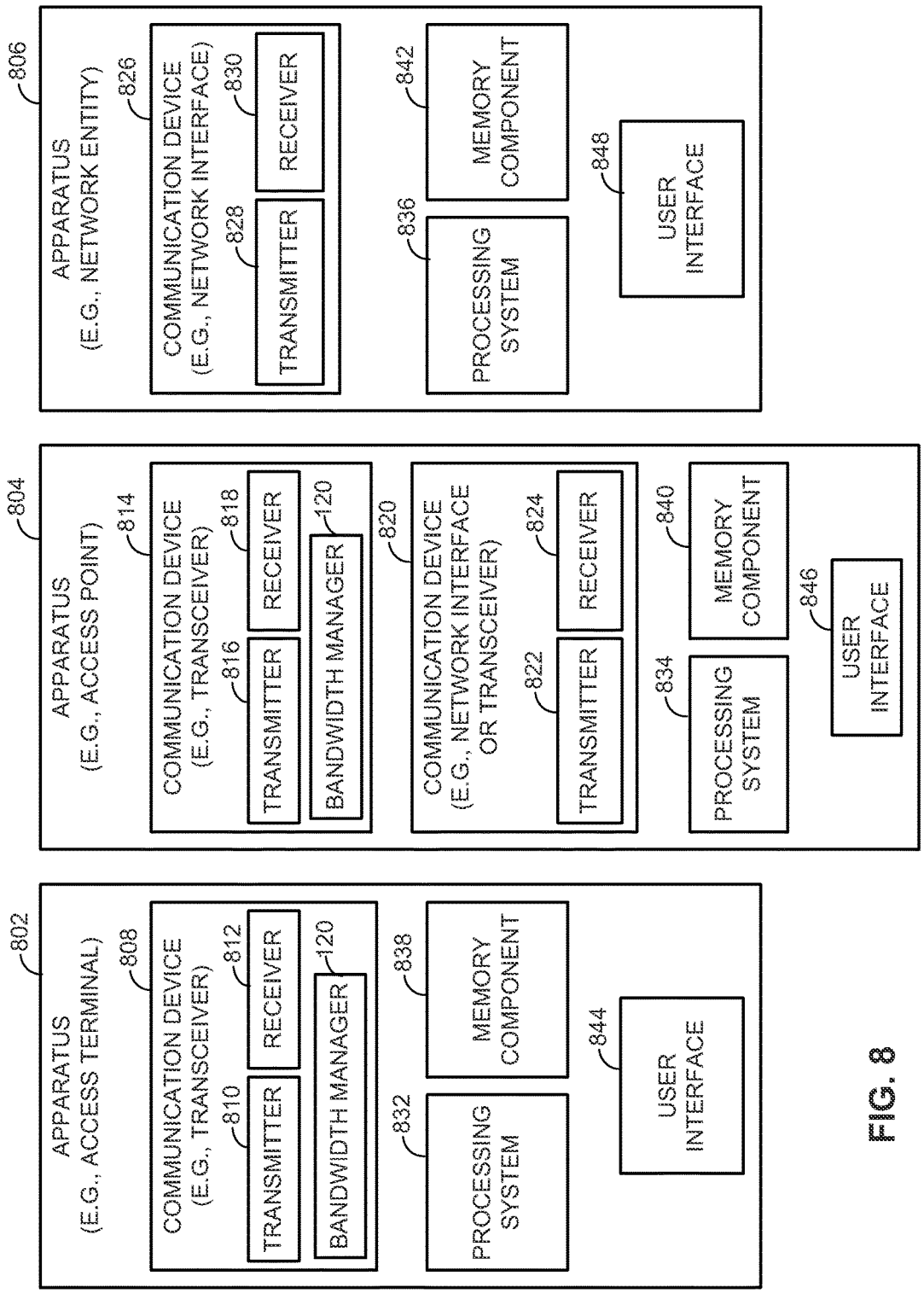
FIG. 8 is a simplified block diagram of several sample aspects of components that may be employed in communication nodes.

FIG. 8 illustrates several sample components (represented by corresponding blocks) that may be incorporated into an apparatus 802, an apparatus 804, and an apparatus 806 (e.g., corresponding to an access terminal, an access point, and a network entity, respectively) to support dynamic bandwidth adaptation operations as taught herein. The apparatus 802 and the apparatus 804, for example, may include a bandwidth manager 120 for determining which channels to use for a transmission. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated radio access technology. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). Additionally, each of the communication devices 808 and 814 may include a bandwidth manger 120 for determining whether to wait for additional channel(s) to become available for a transmission. If the apparatus 804 is a relay access point, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 804 comprises a network listen module.

The apparatus 806 (and the apparatus 804 if it is not a relay access point) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay access point, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with dynamic bandwidth adaptation operations as taught herein. The apparatus 802 includes a processing system 832 for providing functionality relating to, for example, communicating with an access point to support dynamic bandwidth management as taught herein and for providing other processing functionality. The apparatus 804 includes a processing system 834 for providing functionality relating to, for example, dynamic bandwidth management as taught herein and for providing other processing functionality. The apparatus 806 includes a processing system 836 for providing functionality relating to, for example, dynamic bandwidth management as taught herein and for providing other processing functionality. The apparatuses 802, 804, and 806 include memory devices 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatus 802 is shown in FIG. 8 as including components that may be used in the various examples described herein. In practice, the illustrated blocks may have different functionality in different aspects.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
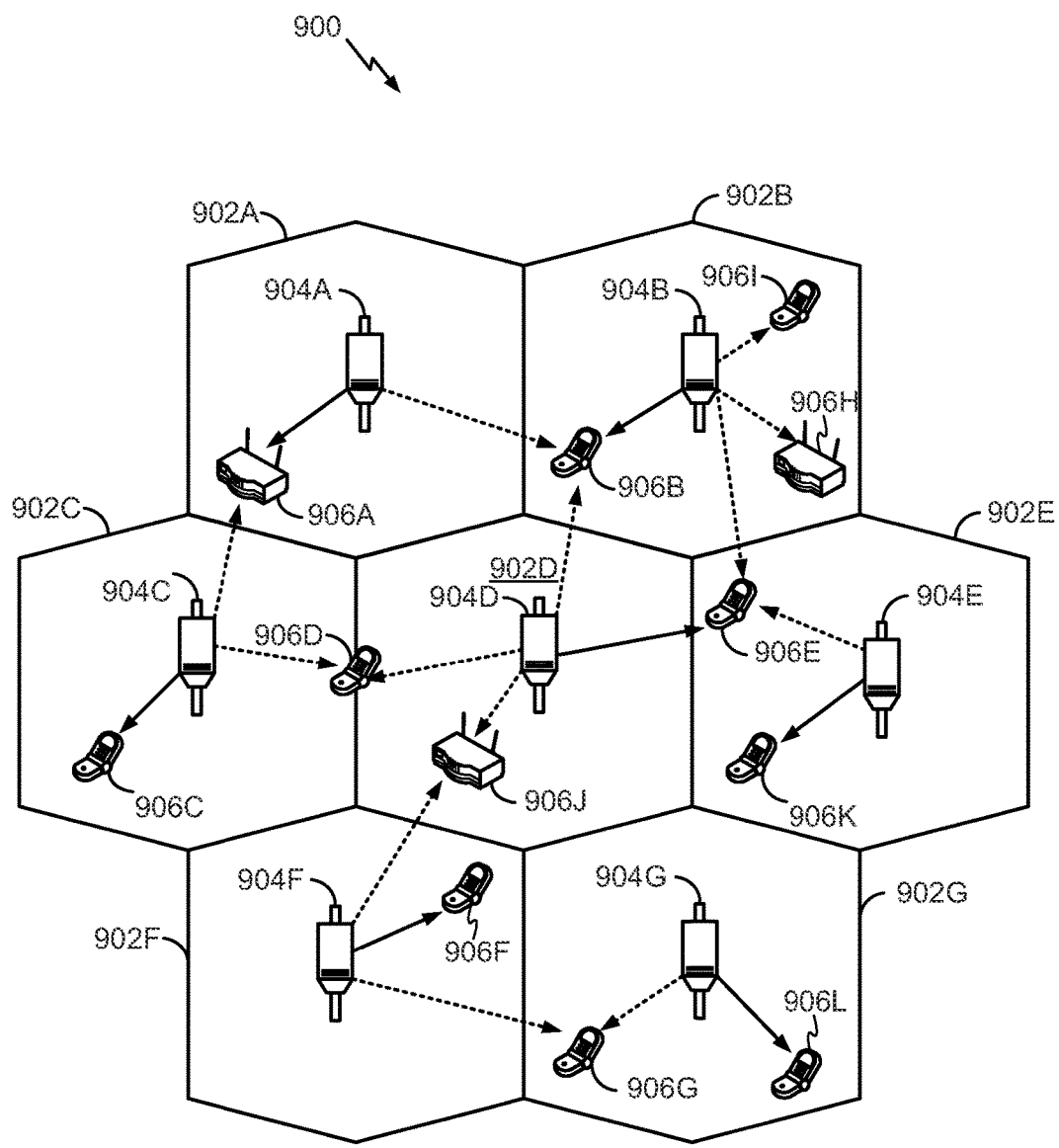
FIG. 9 is a simplified diagram of a wireless communication system.

FIG. 9 illustrates a wireless communication system 900, configured to support a number of users, in which the teachings herein may be implemented. For example, the access terminals 906 and the access points 904 may be LBEs and include a bandwidth manager 120 (FIG. 1). The access terminals 906 and/or the access points 904 may implement the method 200 illustrated in FIG. 2. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoft, for example. The wireless communication system 900 may provide service over a large geographic region. For example, macro cells 902A-902G may cover a few blocks in a neighborhood or several miles in a rural environment.

Figure 10:
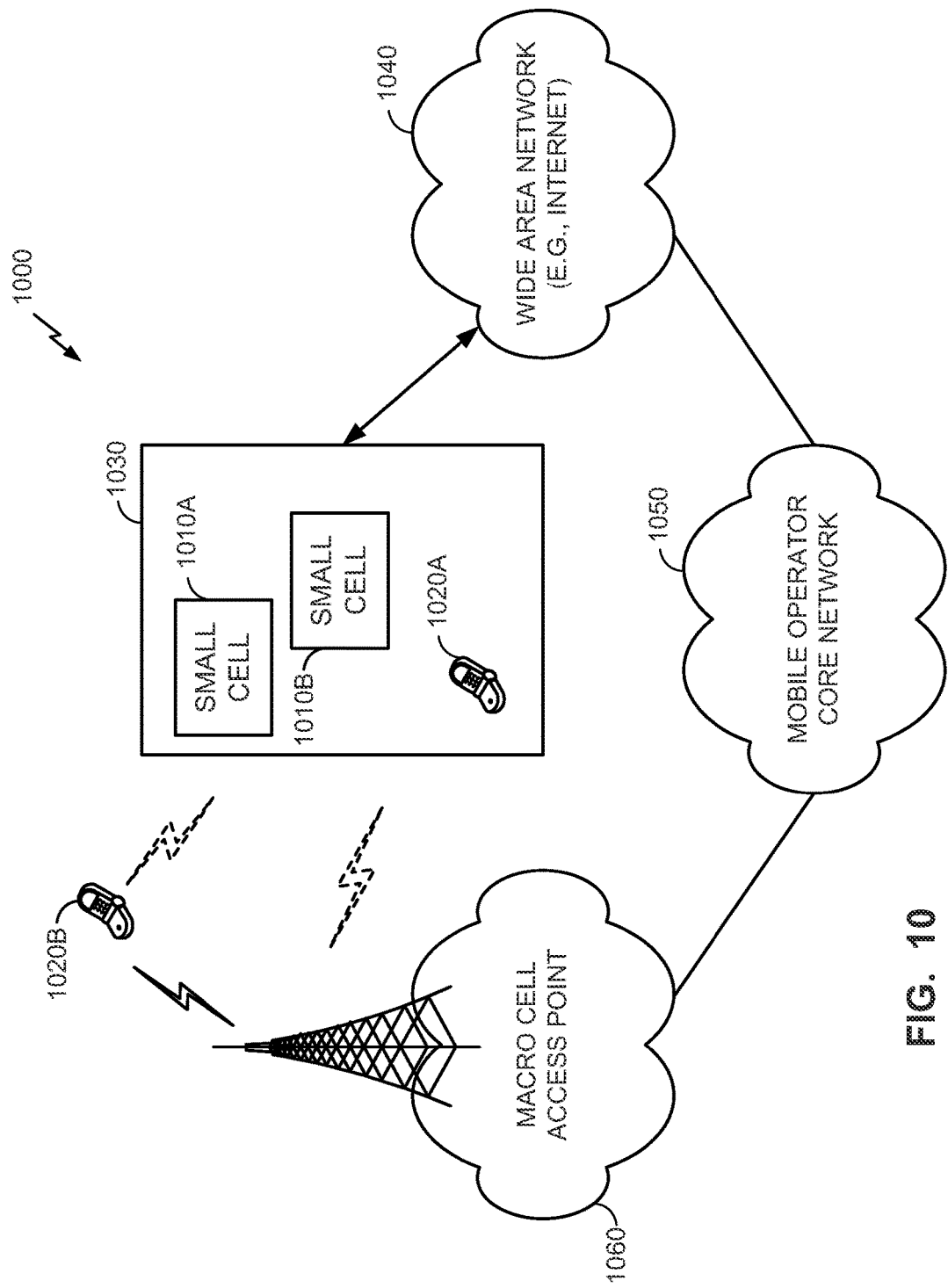
FIG. 10 is a simplified diagram of a wireless communication system including small cells.

FIG. 10 illustrates an example of a communication system 1000 where one or more small cells are deployed within a network environment. The communication system 1000 may include one or more LBEs. For example, the small cells 1010 and access terminals 1020 may be LBEs including a bandwidth manager 120 for determining channels to use for transmissions. A small cell 1010 and/or an access terminal 1020 may implement the method 200 illustrated in FIG. 2. Specifically, the system 1000 includes multiple small cells 1010 (e.g., small cells 1010A and 1010B) installed in a relatively small scale network environment (e.g., in one or more user residences 1030). Each small cell 1010 may be coupled to a wide area network 1040 (e.g., the Internet) and a mobile operator core network 1050 via a DSL router, a cable modem, a wireless link, or other connectivity means (not shown). As will be discussed below, each small cell 1010 may be configured to serve associated access terminals 1020 (e.g., access terminal 1020A) and, optionally, other (e.g., hybrid or alien) access terminals 1020 (e.g., access terminal 1020B). In other words, access to small cells 1010 may be restricted whereby a given access terminal 1020 may be served by a set of designated (e.g., home) small cell(s) 1010 but may not be served by any non-designated small cells 1010 (e.g., a neighbor's small cell 1010).

Figure 11:
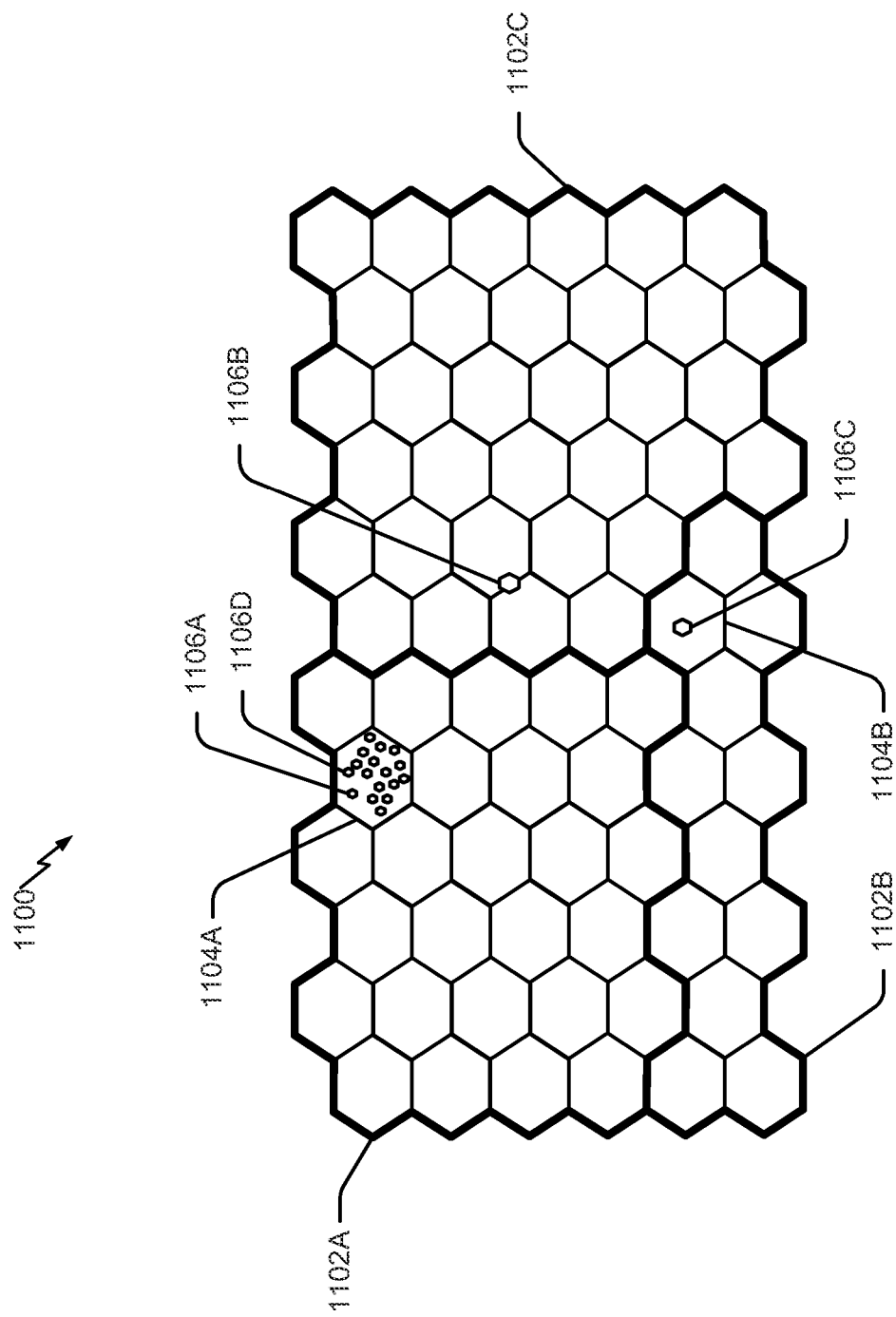
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. One or more LBEs, each including a bandwidth management component 120 (FIG. 1) may operate within a tracking area 1102. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 might not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a small cell 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of small cells 1010 (e.g., the small cells 1010A and 1010B that reside within a corresponding user residence 1030). For example, when a subscriber is outside his home, he is served by a standard macro access point (e.g., access point 1060) and when the subscriber is at home, he is served by a small cell (e.g., small cell 1010A). Here, a small cell 1010 may be backward compatible with legacy access terminals 1020.

A small cell 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060). As discussed above, the small cell 1010 and/or an access terminal 1020 may include a bandwidth manager 120 for selecting one or more frequencies to use for a transmission based, in part, on the usage by macro access point 1060.

In some aspects, an access terminal 1020 may be configured to connect to a preferred small cell (e.g., the home small cell of the access terminal 1020) whenever such connectivity is possible. For example, whenever the access terminal 1020A is within the user's residence 1030, it may be desired that the access terminal 1020A communicate only with the home small cell 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred small cell 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1010, the access terminal 1020 selects the small cell 1010 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1010 that reside within the corresponding user residence 1030). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
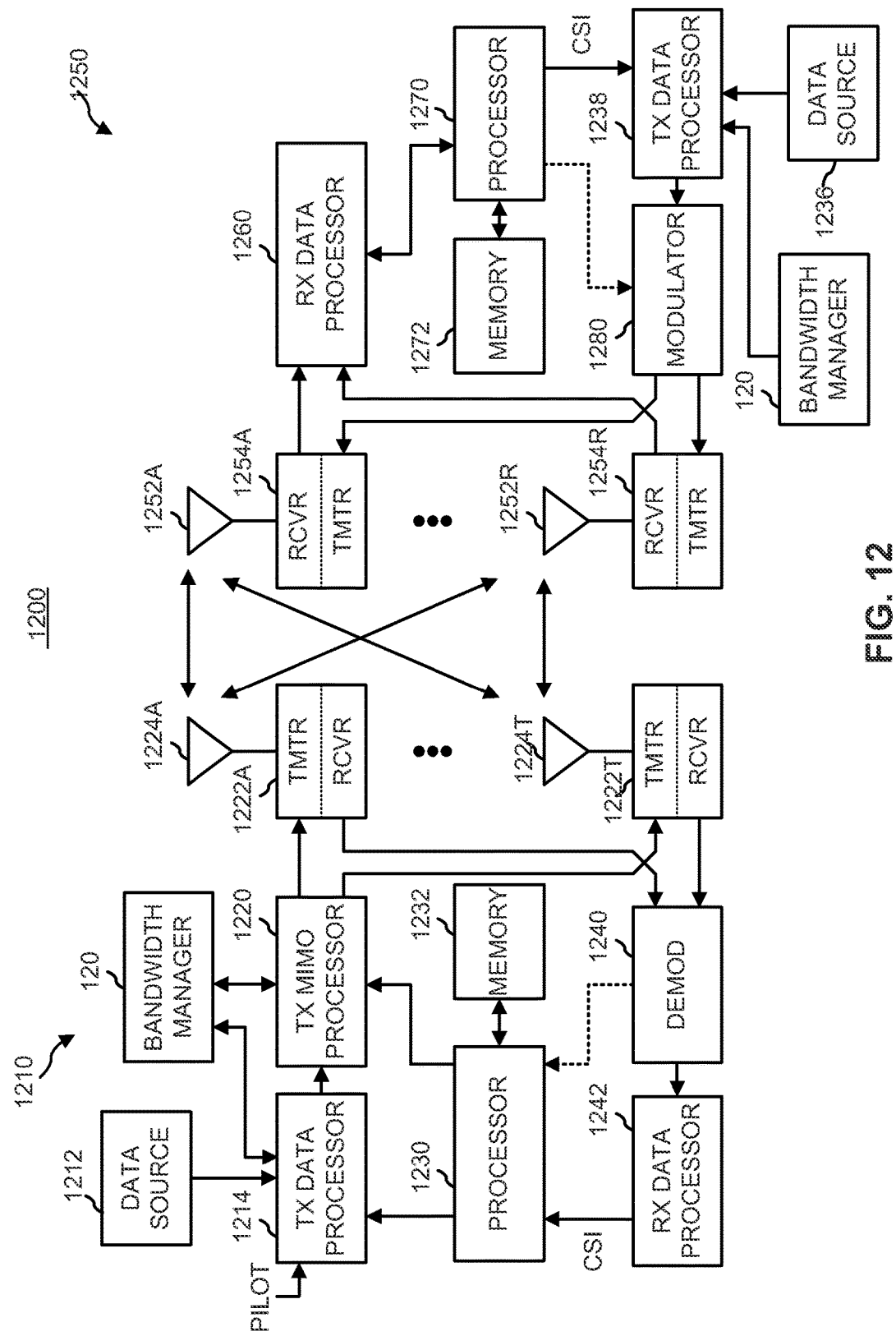
FIG. 12 is a simplified block diagram of several sample aspects of communication components.

FIG. 12 illustrates in more detail the components of a wireless device 1210 (e.g., a small cell AP) and a wireless device 1250 (e.g., a UE) of a sample communication system 1200 that may be adapted as described herein. For example, each of wireless device 1210 and wireless device 1250 may include a bandwidth manager 120 for determining which channels to use for transmissions. Either the wireless device 1210 or the wireless device 1250 may implement the method illustrated in FIG. 2. The bandwidth manager 120 may be a separate component or may be implemented by components such as TX data processor 1214 and TX MIMO processor 1220 of wireless device 1210 or by TX data processor 1238 of device 1250. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides NT modulation symbol streams to NT transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1222A through 1222T are then transmitted from NT antennas 1224A through 1224T, respectively.

At the device 1250, the transmitted modulated signals are received by NR antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the NR received symbol streams from NR transceivers 1254 based on a particular receiver processing technique to provide NT "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which precoding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210. The bandwidth manager 120 may determine the channels used by TX data processor 1238.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

It will be appreciated that for each device 1210 and 1250 the functionality of two or more of the described components may be provided by a single component. It will be also be appreciated that the various communication components illustrated in FIG. 12 and described above may be further configured as appropriate to perform communication adaptation as taught herein. For example, the processors 1230/1270 may cooperate with the memories 1232/1272 and/or other components of the respective devices 1210/1250 to perform the communication adaptation as taught herein.

Figure 13:
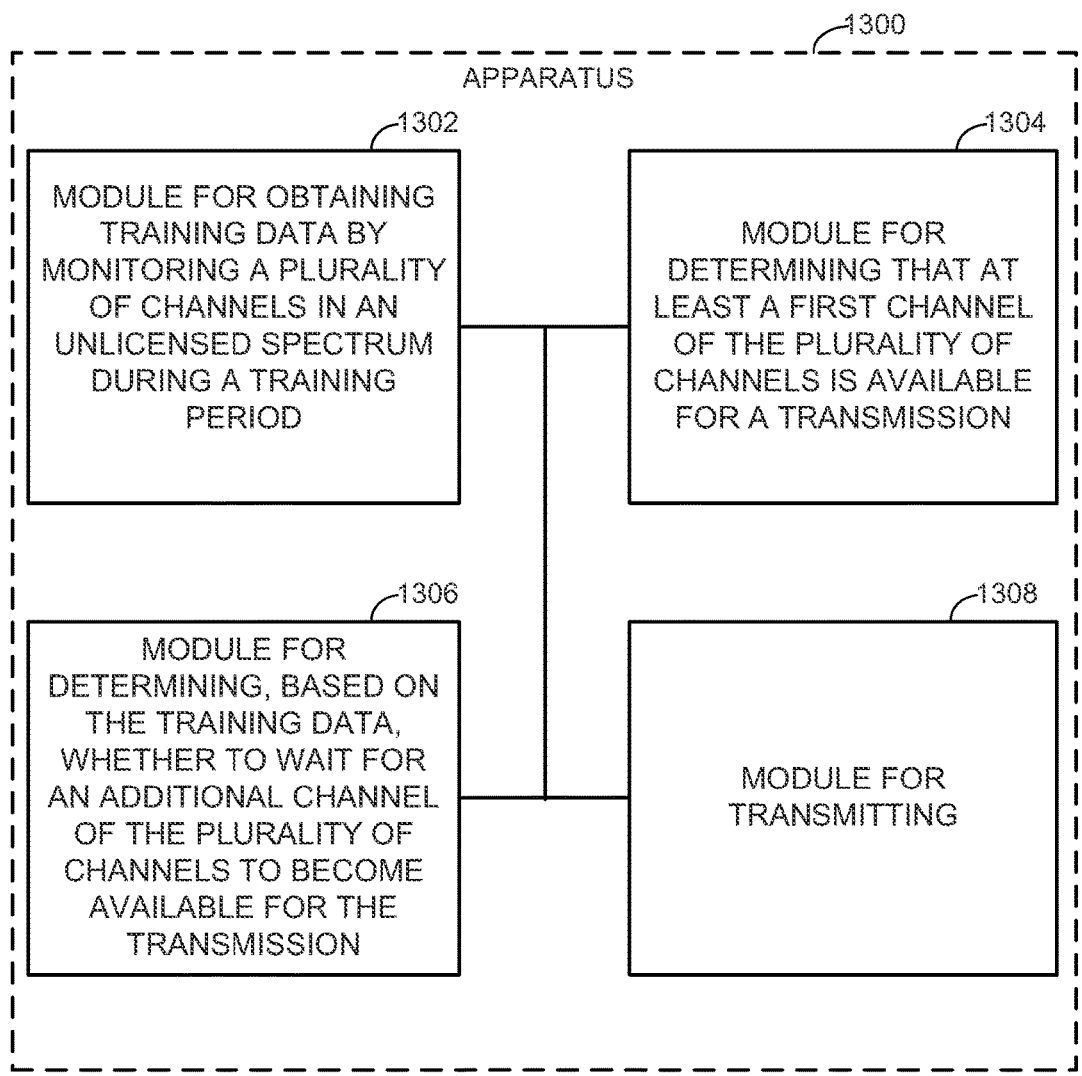
FIG. 13 is a simplified block diagram of several sample aspects of an apparatus configured to support communication as taught herein.

FIG. 13 illustrates an example access point apparatus 1300 represented as a series of interrelated functional modules. A module for obtaining training data 1302 may correspond at least in some aspects to, for example, a LBE such as an access terminal or access point as discussed herein. A module for determining that at least a first channel of the plurality of channels is available 1304 may correspond at least in some aspects to, for example, a processing system as discussed herein. A module for determining whether to wait for an additional channel 1306 may correspond at least in some aspects to, for example, a processing system in conjunction with a communication device as discussed herein. A module for transmitting 1308 may correspond at least in some aspects to, for example, a transmitter in conjunction with a communication device as discussed herein.

The functionality of the modules of FIG. 13 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 13 as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for dynamic bandwidth management in a wireless communication device, the method comprising:
obtaining, by a radio receiver, training data by monitoring a plurality of channels in an unlicensed spectrum during a training period prior to initiating a transmission by performing a clear channel assessment of the plurality of channels based on presence of data for the transmission, wherein obtaining the training data comprises estimating, for a set of channel states, a corresponding set of probabilities indicating likelihoods that no additional channel is to become available within a transmission opportunity following the transmission, wherein estimating the probability that no additional channel is to become available comprises:
   determining, by a processor, for a plurality of transmission times during the training period, whether the additional channel has become available during a transmission opportunity following each of the plurality of transmission times;
   associating, in a memory, each of the plurality of transmission times with a respective channel state of the set of channel states at the transmission time; and
   determining, by the processor, a portion of the plurality of transmission times for each channel state where no additional channel has become available;
determining, via the radio receiver, that at least a first channel of the plurality of channels is available for the transmission;
determining, by the processor, based on the training data, while at least the first channel of the plurality of channels is available, whether to wait for an additional channel of the plurality of channels to become available for the transmission before beginning the transmission using at least the first channel, wherein determining whether to wait for the additional channel comprises:
   selecting a first probability from the set of probabilities based on a first channel state from the set of channel states in the memory, wherein the first channel state is a current channel state;
   generating a first random or pseudo-random number; and
   waiting for the additional channel when the first random or pseudo-random number exceeds a first threshold value, wherein the first threshold value is based on the probability;
determining, by the radio receiver, that the additional channel has become available; and
transmitting the data for the transmission on at least the first channel and the additional channel.

2. The method of claim 1, wherein the set of channel states is based on a number of available channels at the respective transmission time.

3. The method of claim 1, wherein the set of channel states is based on a combination of available channels at the respective transmission time.

4. The method of claim 1, further comprising:
   determining that a first additional channel has become available;
   selecting a second probability from the set of probabilities based on a second channel state from the set of channel states;
   generating a second random or pseudo-random number; and
   waiting for a second additional channel when the second random or pseudo-random number exceeds a second threshold value, wherein the second threshold value is based on the second probability.

5. The method of claim 1, wherein obtaining the training data comprises:
   collecting a plurality of samples for potential transmission times having at least one available channel of the plurality of channels, each sample indicating states of a plurality of backoff counters corresponding respectively to the plurality of channels; and
   evaluating each sample to determine whether the transmission time of the sample is a good transmission time.

6. The method of claim 5, wherein determining, based on the training data, whether to wait for an additional channel of the plurality of channels to become available for the transmission comprises using a machine learning classifier to classify a current counter state vector for the plurality of channels based on the plurality of samples.

7. The method of claim 6, further comprising separating the plurality of samples into different sets based on a number of available channels of each sample, wherein using a machine learning classifier to classify a current counter state vector comprises using the machine learning classifier to classify the current counter state vector based on the set corresponding to a number of available channels of the current counter state vector.

8. The method of claim 5, wherein determining that the transmission time of the sample is a good transmission time comprises determining that a number of available channels did not increase during a transmission opportunity following the transmission time.

9. The method of claim 5, wherein determining that the transmission time of the sample is a good transmission time comprises determining that an available bandwidth of the available channels did not increase during a transmission opportunity following the transmission time.

10. The method of claim 5, wherein the state of a backoff counter from the plurality of backoff counters corresponding to an available channel indicates an amount of time that the available channel has been available.

11. The method of claim 1, further comprising waiting for a duration of a transmission opportunity and transmitting on at least the first channel when no additional channels become available during the duration of the transmission opportunity.

12. An apparatus for dynamic bandwidth management in a wireless communication device, comprising:
   a transceiver;
   a memory configured to store computer executable instructions and training data; and
   a processor configured to execute the computer executable instructions to:
   obtain training data by monitoring, via the transceiver, a plurality of channels in an unlicensed spectrum during a training period prior to initiating a transmission by performing a clear channel assessment of the plurality of channels based on presence of data for the transmission, wherein obtaining the training data comprises estimating, for a set of channel states, a corresponding set of probabilities indicating likelihoods that no additional channel is to become available within a transmission opportunity following the transmission, wherein to obtain the training data, the processor is configured to:
      determine, for a plurality of transmission times during the training period, whether the additional channel has become available during a transmission opportunity following each of the plurality of transmission times;
      associate, in the memory, each of the plurality of transmission times with a respective channel state of the set of channel states at the transmission time; and
      determine a portion of the plurality of transmission times for each channel state where no additional channel has become available;
   determine, via the transceiver, that at least a first channel of the plurality of channels is available for the transmission;

determine, based on the training data, while at least the first channel of the plurality of channels is available, whether to wait for an additional channel of the plurality of channels to become available for the transmission before beginning the transmission via the transceiver using at least the first channel;

select a first probability from the set of probabilities based on a first channel state from the set of channel states in the memory, wherein the first channel state is a current channel state;

generate a first random or pseudo-random number;

wait for the additional channel when the first random or pseudo-random number exceeds a first threshold value, wherein the first threshold value is based on the probability determine, via the transceiver, that the additional channel has become available; and transmit the data for the transmission on at least the first channel and the additional channel.

13. The apparatus of claim 12, wherein the set of channel states is based on a number of available channels at the respective transmission time.

14. The apparatus of claim 12, wherein the set of channel states is based on a combination of available channels at the respective transmission time.

15. The apparatus of claim 12, wherein the processor is further configured to:

determine that a first additional channel has become available;

select a second probability from the set of probabilities based on a second channel state from the set of channel states;

generate a second random or pseudo-random number; and wait for a second additional channel when the second random or pseudo-random number exceeds a second threshold value, wherein the second threshold value is based on the second probability.

16. The apparatus of claim 12, wherein the processor is further configured to:

collect a plurality of samples for potential transmission times having at least one available channel of the plurality of channels, each sample indicating states of a plurality of backoff counters corresponding respectively to the plurality of channels; and evaluate each sample to determine whether the transmission time of the sample is a good transmission time.

17. The apparatus of claim 16, wherein the processor is configured to classify a current counter state vector for the plurality of channels based on the plurality of samples.

18. The apparatus of claim 17, wherein the processor is further configured to separate the plurality of samples into different sets based on a number of available channels of each sample, and classify the current counter state vector based on the set corresponding to a number of available channels of the current counter state vector.

19. The apparatus of claim 16, wherein determining that the transmission time of the sample is a good transmission time comprises determining that a number of available channels did not increase during a transmission opportunity following the transmission time.

20. The apparatus of claim 16, wherein determining that the transmission time of the sample is a good transmission time comprises determining that an available bandwidth of the available channels did not increase during a transmission opportunity following the transmission time.

21. The apparatus of claim 16, wherein the state of a backoff counter from the plurality of backoff counters corresponding to an available channel indicates an amount of time that the available channel has been available.

22. The apparatus of claim 12, wherein the processor is configured to wait for a duration of a transmission opportunity and transmit on at least the first channel when no additional channels become available during the duration of the transmission opportunity.

23. An apparatus for dynamic bandwidth management in a wireless communication device, comprising:

means for obtaining training data by monitoring, with a radio receiver, a plurality of channels in an unlicensed spectrum during a training period prior to initiating a transmission by performing a clear channel assessment of the plurality of channels based on presence of data for the transmission, wherein obtaining the training data comprises estimating, for a set of channel states, a corresponding set of probabilities indicating likelihoods that no additional channel is to become available within a transmission opportunity following the transmission, wherein the means for obtaining training data is configured to:

determine, for a plurality of transmission times during the training period, whether the additional channel has become available during a transmission opportunity following each of the plurality of transmission times;

associate, in a memory, each of the plurality of transmission times with a respective channel state of the set of channel states at the transmission time; and determine a portion of the plurality of transmission times for each channel state where no additional channel has become available;

means for determining, via the radio receiver, that at least a first channel of the plurality of channels is available for the transmission; and means for determining, based on the training data, while at least the first channel of the plurality of channels is available, whether to wait for an additional channel of the plurality of channels to become available for the transmission before beginning the transmission using at least the first channel, wherein the means for determining whether to wait is configured to:

select a first probability from the set of probabilities based on a first channel state from the set of channel states in the memory, wherein the first channel state is a current channel state;

generate a first random or pseudo-random number; and wait for the additional channel when the first random or pseudo-random number exceeds a first threshold value, wherein the first threshold value is based on the probability, wherein the means for determining, via the radio receiver, that at least the first channel of the plurality of channels is available for the transmission determines that the additional channel is also available for the transmission; and means for transmitting the data for the transmission on at least the first channel and the additional channel.

24. A non-transitory computer readable medium storing computer executable code for dynamic bandwidth management in a wireless communication device, comprising:

code for obtaining training data by monitoring, with a radio receiver, a plurality of channels in an unlicensed spectrum during a training period prior to initiating a transmission by performing a clear channel assessment of the plurality of channels based on presence of data for the transmission, wherein obtaining the training data comprises estimating, for a set of channel states, a corresponding set of probabilities indicating likelihoods that no additional channel is to become available within a transmission opportunity following the transmission, wherein the code for obtaining training data includes code for:

determining, by a processor, for a plurality of transmission times during the training period, whether the additional channel has become available during a transmission opportunity following each of the plurality of transmission times;

associating, in a memory, each of the plurality of transmission times with a respective channel state of the set of channel states at the transmission time; and determining a portion of the plurality of transmission times for each channel state where no additional channel has become available;

code for determining, via the radio receiver, that at least a first channel of the plurality of channels is available for the transmission; and code for determining, based on the training data, while at least the first channel of the plurality of channels is available, whether to wait for an additional channel of the plurality of channels to become available for the transmission before beginning the transmission using at least the first channel, wherein the code for determining whether to wait includes code for:

selecting a first probability from the set of probabilities based on a first channel state from the set of channel states, wherein the first channel state is a current channel state;

generating a first random or pseudo-random number; and waiting for the additional channel when the first random or pseudo-random number exceeds a first threshold value, wherein the first threshold value is based on the probability;

determining, by the radio receiver, that the additional channel has become available; and transmitting the data for the transmission on at least the first channel and the additional channel.

* * * * *